United States Patent [19]

Avery

[11] 4,394,869
[45] Jul. 26, 1983

[54] RESET CONTROLLER WITH IMPROVED INPUT MECHANISM

[75] Inventor: Gilbert H. Avery, Memphis, Tenn.

[73] Assignee: Barber-Colman Company, Rockford, Ill.

[21] Appl. No.: 331,362

[22] Filed: Dec. 16, 1981

[51] Int. Cl.³ .......................................... G05D 16/06
[52] U.S. Cl. ..................................... 137/82; 137/486; 236/49
[58] Field of Search .............................. 236/49, 82, 87; 137/486, 82

[56] References Cited

U.S. PATENT DOCUMENTS

| | | | |
|---|---|---|---|
| 3,020,490 | 2/1962 | Kleiss | 236/82 X |
| 3,126,904 | 3/1964 | Ciarcariello | 236/82 X |
| 3,174,298 | 3/1965 | Kleiss | 236/82 X |
| 3,395,726 | 8/1968 | Cross et al. | 137/486 X |
| 3,994,434 | 11/1976 | Boyer et al. | 236/49 |
| 4,264,035 | 4/1981 | Maxson et al. | 236/87 |
| 4,284,237 | 8/1981 | Harris et al. | 236/49 |

Primary Examiner—William E. Tapolcai
Attorney, Agent, or Firm—Leydig, Voit, Osann, Mayer & Holt, Ltd.

[57] ABSTRACT

A controller for a damper maintains a substantially constant volumetric rate of flow of air through a duct into a controlled space for a given condition in the space and resets the rate of flow to three different levels as a function of three different conditions in the space. Two pneumatic actuators respond to the four conditions in the space and produce forces which vary with the conditions. A floating lever receives the forces and causes the controller to set the air flow as a function of the sum of the weighted values of the forces produced by the two actuators.

5 Claims, 4 Drawing Figures

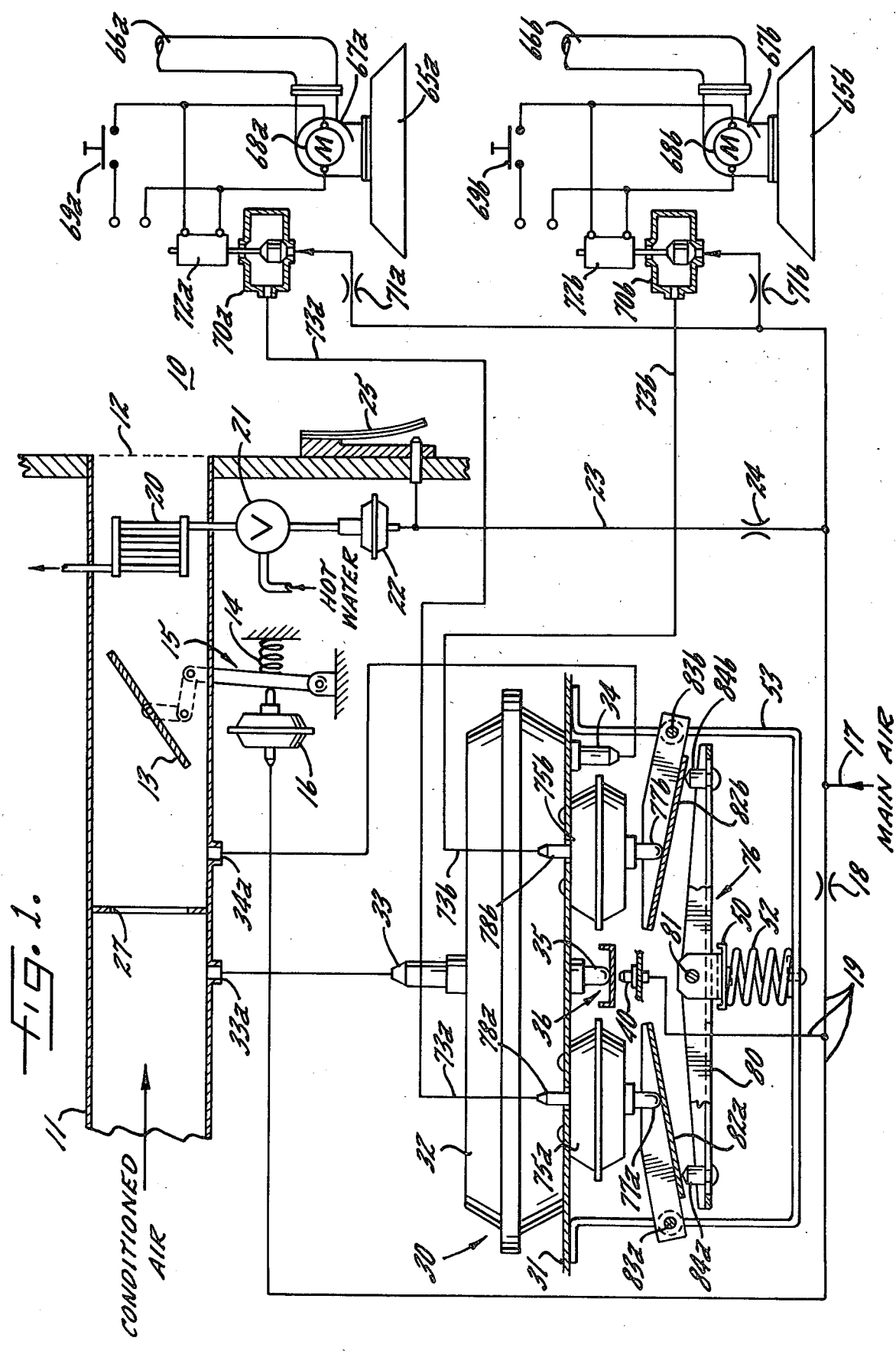

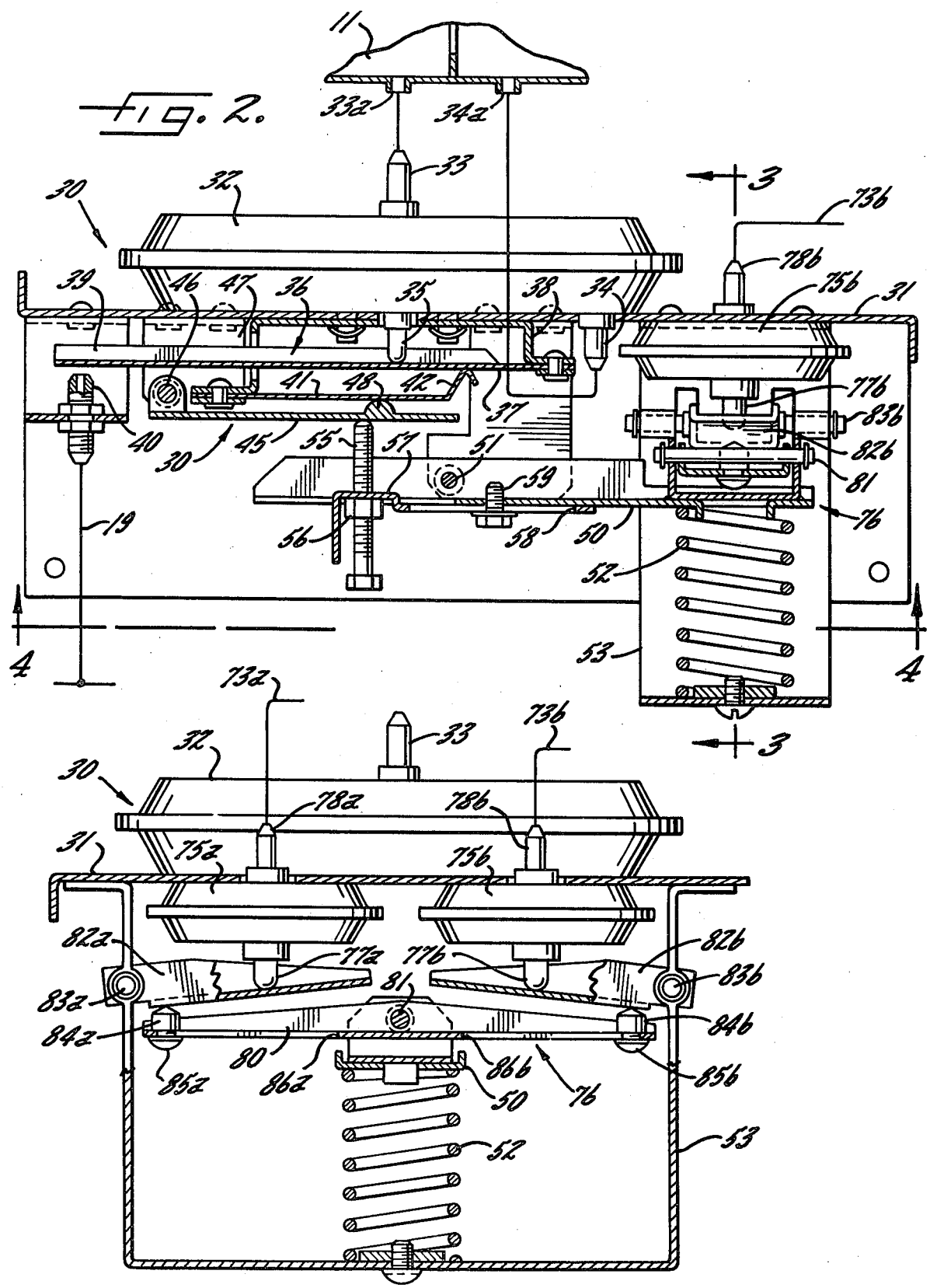

RESET CONTROLLER WITH IMPROVED INPUT MECHANISM

BACKGROUND OF THE INVENTION

This invention relates to a controller for regulating the volumetric rate of flow of air through a duct. More particularly, the invention relates to a controller for maintaining a substantially constant volumetric rate of flow of air under a given condition and for resetting the constant volumetric flow rate under one or more different conditions.

A controller of this general type is disclosed in Maxson et al U.S. Pat. No. 4,264,035. In that controller, a minimum volumetric flow rate is maintained under one condition. Under a different condition, a pneumatic actuator resets the controller to establish a higher volumetric flow rate. If yet a different condition exists, a second pneumatic actuator further resets the controller to establish a still higher flow rate. Thus, a controller with two pneumatic actuators is capable of responding to three different conditions.

SUMMARY OF THE INVENTION

The general aim of the present invention is to provide a new and improved controller of the above general type in which two actuators are advantageously used to enable the controller to respond to four different conditions without significantly increasing the complexity of the controller.

A more detailed object is to achieve the foregoing by providing a controller having a floating lever which uniquely adds the forces produced by the two actuators and controls the air flow as a function of the sum of the weighted values of the forces. In this way, the controller responds differently depending upon whether both actuators are producing forces, whether neither actuator is producing a force or whether one or the other of the actuators is alone producing a force.

The invention also resides in the novel means used to establish the weighted values of the forces exerted on the floating lever in relation to the true values of the forces produced by the actuators.

These and other objects and advantages of the invention will become more apparent from the following detailed description when taken in conjunction with the accompanying drawings.

BRIEF DESCRIPTION OF THE DRAWINGS

FIG. 1 is a front elevational view, partly in section, and schematically showing a new and improved controller incorporating the unique features of the present invention in a typical installation.

FIG. 2 is a side elevational view, partly in section, of the controller shown in FIG. 1.

FIG. 3 is a fragmentary cross-section taken substantially along the line 3—3 of FIG. 2.

DETAILED DESCRIPTION OF THE PREFERRED EMBODIMENT

Figure 4:
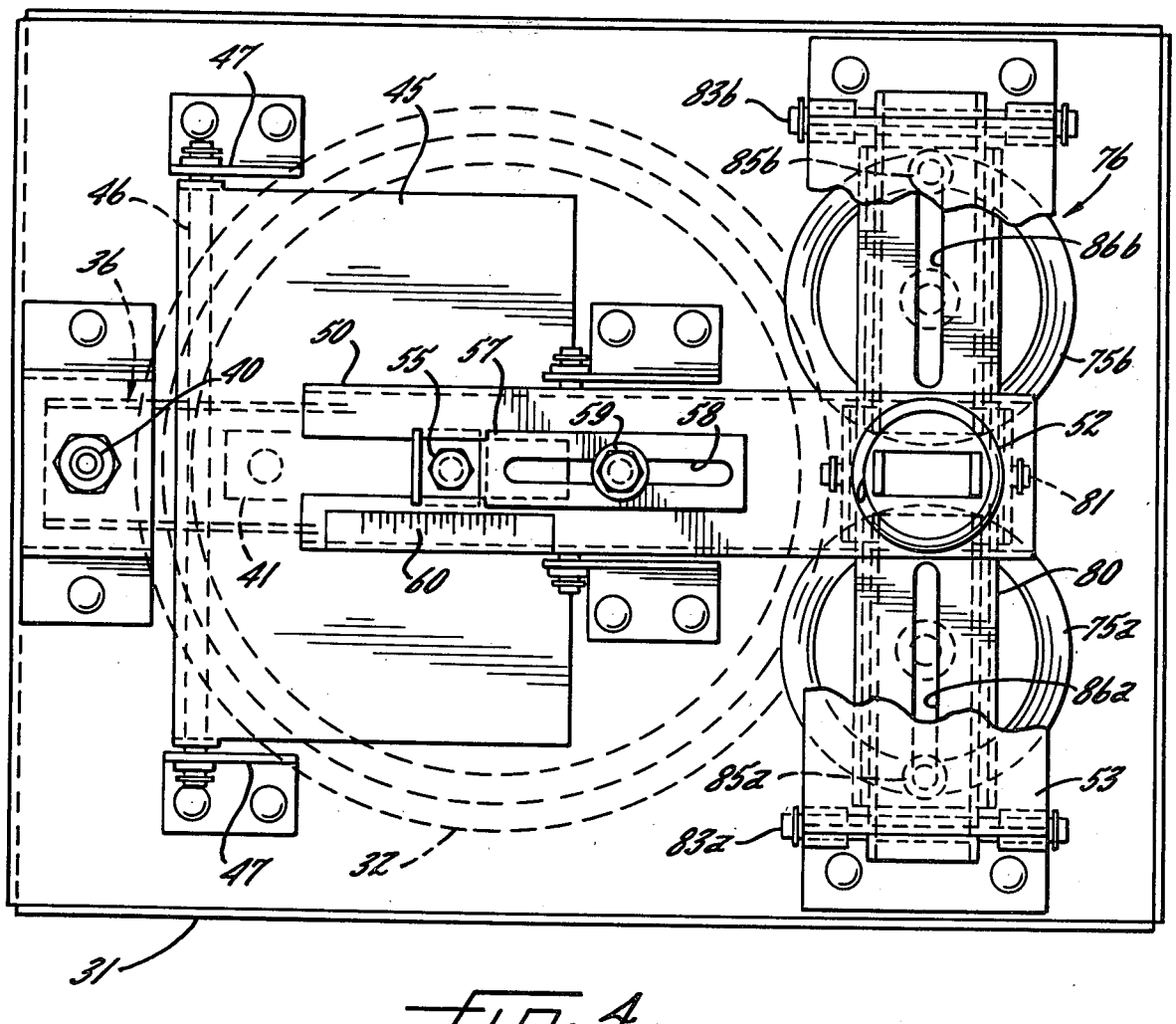
FIG. 4 is a bottom plan view as taken substantially along the line 4—4 of FIG. 2.

FIG. 1 shows one application of a pneumatic controller of the invention and, in this particular instance, it may be assumed that the space 10 to be regulated by the controller is in an interior zone which normally requires the introduction of cold air in order to maintain a comfortable temperature. To meet this requirement, cold conditioned air is delivered through a duct 11 and a grille 12 into the controlled space 10. A damper 13 controls the volumetric rate of flow of conditioned air through the duct. The damper is biased to a normally open position by a spring 14 acting through a linkage 15. Variable damper branch air pressure is supplied to a pneumatic damper actuator 16 which is positioned to oppose the bias force exerted by the spring on the linkage and which thus determines the position of the damper. Branch air is obtained from a source of compressed air, usually at 15 psig., supplied through a main 17. After passing through a restrictor 18, the main air becomes damper branch air in a damper branch 19 communicating with the actuator 16. The manner of varying the pressure of the damper branch air will be disclosed later.

Under some conditions, the conditioned air being delivered may lower the temperature of the controlled space 10 below the comfort level. Additional heat then must be supplied. When the conditioned air being delivered to the space is heated, the operation is referred to as reheat. Any type of controlled heat exchanger may be employed to produce reheat. A hot water-to-air heat exchanger 20 is shown installed in the duct 11 downstream from the damper 13. The control therefor is shown as a normally biased open hot water valve 21 variably closed by a pneumatic actuator 22 as a function of the variable pressure in control branch 23. The air in the control branch is obtained from the main 17 through a restrictor 24. The pressure in control branch 23 is determined by a pneumatic thermostat 25 which is direct acting in this particular instance. The hot water valve is biased such that, as the controlled space temperature sensed by thermostat 25 rises from a sub-normal value, the valve begins to close at some predetermined value of control branch air pressure. This continues until the valve is closed at control branch air pressure corresponding substantially to the set point temperature. When the sensed temperature exceeds the set point temperature, the valve remains closed. Many such systems control over a 3-13 psig. range of branch air pressure with the set-point at 8 psig. The valve would then begin to close at substantially 3 psig. and become completely closed at substantially 8 psig. When the sensed temperature falls, the sequence is reversed.

The controller 30 comprises a base 31 upon which is mounted a differential pressure-to-mechanical force transducer 32. A high pressure port 33 on the transducer communicates with a high pressure tap 33a located upstream from an orifice 27 in the duct 11 while a low pressure port 34 communicates with a low pressure tap 34a located downstream from the orifice. The transducer thus produces a differential force at a pin 35 proportional to the difference between the pressures of air in the duct upstream and downstream from the orifice and thereby furnishes a measure of the volumetric rate of flow of conditioned air through the duct. The pin 35 bears against a rigid flapper 36 (FIG. 2) which is joined to a short flexible portion 37 cantilevered on a bracket 38 in fixed spaced relation to the base 31. The free end portion 39 of the flapper is movable toward and away from a bleed nozzle 40 which communicates with the damper branch 19 to control the branch air pressure therein. The flapper is urged away from the nozzle by a bias member such as a leaf spring 41 cantilevered on the bracket 38 and having a free end portion 42 engaging the flapper to apply a bias force in opposition to the variable force applied by the pin 35.

The variable position of the flapper 36 with respect to the nozzle 40 thus is established by a balance of the forces applied by the pin 35 and the spring 41. As the rate of flow of conditioned air through the duct 11 increases, the differential pressure between the taps 33a and 34a increases, producing a greater force by the pin 35 against the flapper to move the flapper closer to the nozzle. This causes less air to bleed through the nozzle so as to increase the damper branch air pressure and increase the force applied by the damper actuator 16. Accordingly, the actuator moves the damper 13 further toward its closed position, thereby reducing the rate of flow of conditioned air through the duct in a manner tending to maintain a constant volumetric rate of air flow therethrough regardless of the pressures upstream and downstream of the orifice 27.

A constant volumetric flow of air into the space 10 is desirable for a given condition in the space but, when the condition in the space changes, the volumetric inflow of air must be increased or decreased to conform to the changed condition. To this end, the steady biasing force which the leaf spring 41 applies to the flapper 36 is only sufficiently high to assure a desired minimum rate of flow through the duct 11. In order to increase the rate of flow for different conditions in the space 10, a variable biasing force also is applied to the spring 41 and the flapper 36.

For this purpose, a lever 45 (FIGS. 2 and 4) is supported to swing about a pin 46 which is mounted by brackets 47 fixed to the base 31. One portion of the lever 46 underlies the leaf spring 41 and its upper side carries a rounded hump 48 which bears against the underside of the leaf spring and urges the latter upwardly. For purposes of simplicity, the hump has been shown as being integral with the lever but it should be understood that the hump or similar means may be placed on the lever in various ways. The purpose of the hump is to transmit force from the lever to the spring while keeping the free end of the lever out of engagement with the spring.

The lever 45 is swung in one direction in response to a lever 50 (FIGS. 2 to 4) swinging in the opposite direction. The lever 50 is pivoted on a pin 51 in fixed relation to the base 31. A bias spring 52 acts between one end portion of the lever 50 and a fixed bracket 53 on the base and exerts a bias force tending to swing the lever counterclockwise and move the opposite end portion of the lever 50 away from the lever 45. As will be explained in detail subsequently, the lever 50 is swung clockwise by a variable force exerted on the lever 50 in opposition to the force of the spring 52.

To cause the lever 45 to swing in response to swinging of the lever 50, a set screw 55 (FIGS. 2 and 4) is carried by the lever 50 and bears against the underside of the lever 45. The set screw may be adjusted vertically relative to the lever 50 and is adapted to be held in its adjusted position by a lock nut 56. In addition, the set screw is adapted to be adjusted lengthwise of the levers 45 and 50 in order to locate the screw selected different distances from the pivot pins 46 and 51. As shown in FIG. 4, the screw extends through and is carried by a slide 57 which is located adjacent the free end portion of the lever 50 and which forms an extension of that lever. An elongated slot 58 is formed through the slide and receives a screw 59 which is threaded into the lever 50. By loosening the screw, the slide may be moved lengthwise of the lever 50 to increase or decrease the distance between the screw 55 and the pivot pin 51 and, of course, to inversely change the distance between the screw and the pivot pin 46. A calibrated scale 60 is located on the lever 50 adjacent the slide to enable the screw to be adjusted to a selected position.

With the foregoing arrangement, the screw 55 may be adjusted vertically on the slide 57 to engage the lever 45 and establish the steady biasing force which is necessary to insure the minimum air flow rate. In other words, the screw acts against the lever 45 which in turns acts through the hump 48 to deflect the leaf spring 41 upwardly into engagement with the flapper 36 with such force as to space the flapper from the nozzle 40 by the distance required to set the minimum air flow rate. By adjusting the screw 55 upwardly relative to the slide 57, the steady biasing force may be increased to increase the minimum flow rate. Conversely, the steady state biasing force is decreased and reduces the minimum flow rate when the screw is adjusted downwardly relative to the slide.

When the lever 50 swings clockwise, the lever 45 is swung counterclockwise and causes the flapper 36 to swing upwardly from the nozzle 40 and increase the flow rate through the duct 11. The flow rate is reduced when the lever 50 swings counterclockwise to permit the lever 45 to swing clockwise and enable the flapper to move toward its closed position. By adjusting the slide 56 relative to the lever 50, the spacing of the screw 55 from the pivots 46 and 51 is changed so as to effectively lengthen or shorten the lever 45 and simultaneously shorten or lengthen the lever 50. Thus, adjustment of the slide to different positions causes the lever 45 to swing through different angular distances when the lever 50 swings through a given angular distance. This effects an adjustment of the air flow span in a manner described in detail in George C. Boyer U.S. application Ser. No. 330,705, filed Dec. 14, 1981 entitled Reset Controller With Improved Air Flow Span Adjustment and assigned to the assignee of the present invention.

In the present instance, the space 10 which receives conditioned air from the duct 11 is a chemical laboratory having two spaced exhaust hoods 65a and 65b communicating with exhaust ducts 66a and 66b, respectively. Blowers 67a and 67b driven by electric motors 68a and 68b are associated with the exhaust hoods 65a and 65b. Upon closure of manually operable switches 69a and 69b, the motors are energized to cause the blowers to exhaust air and chemical fumes from the space 10, through the hoods and into the exhaust ducts. For a purpose to be explained subsequently, valves 70a and 70b are associated with each hood and receive pressurized air from the main 17 via restrictors 71a and 71b, respectively. When a switch is closed to energize the respective blower motor, a solenoid 72a, 72b associated with the valve also is energized and shifts the valve from the position shown in FIG. 1 to permit pressurized air to flow through the valve to a line 73a, 73b. When the solenoid is de-energized, the valve shifts to the position shown in FIG. 1 to cut off the flow of pressurized air and to vent the line 73a, 73b through the valve.

In some cases, it is desirable for the flow of air into the space 10 to be somewhat less (e.g., 50 cfm.) than the total air exhausted from the space through the ducts 66a and 66b so as to maintain negative pressurization in the space and to insure that the atmosphere in the space will not escape except through the exhaust ducts. When neither of the hoods 65a or 65b is operable, it may be assumed that a certain volume of air (e.g., 125 cfm.) escapes through each exhaust duct 66a, 66b. Accordingly, the air flow into the space should be set at 200 cfm. to establish the desired negative differential of 50 cfm. When the hood 65a is operable and the hood 65b is inoperable, it may be assumed that a total of 500 cfm. of air is being exhausted from the space and thus it is necessary to increase the air inflow to 450 cfm. to maintain the desired negative differential. Herein, the capacity of the hood 65b is greater than that of the hood 65a and thus it may be assumed that a total of 600 cmf. is being exhausted when the hood 65b is operable and the hood 65a is inoperable, thereby requiring an inflow of 550 cfm. to maintain the differential. When both hoods are simultaneously operable and a total of 1100 cfm. is being exhausted, the inflow must be increased to 1050 cfm.

Accordingly, four different conditions can exist in the space 10, thereby requiring four different volumetric flow rates through the duct 11 to maintain the desired negative differential. In accordance with the present invention, the single controller 30 is uniquely constructed to respond to all four conditions and yet is substantially no more complex than prior controllers adapted to respond to only three conditions.

In carrying out the invention, the controller 30 includes first and second actuators 75a and 75b for producing first and second forces which vary as functions of conditions in the space 10. A floating lever system 76 receives the forces produced by the actuators and causes the lever 50 to be positioned with a force which varies as a function of the sum of the weighted values of the actuator forces. By virtue of the floating lever system 76, any of four forces resulting from any of four conditions in the space 10 may be applied to the lever 50 to change the air inflow and yet only two actuators 75a and 75b are required to produce the four forces.

More specifically, the actuators 75a and 75b are mounted in side-by-side relation on the base 31, the actuators being of the pneumatic type and including reciprocating pins 77a and 77b which are extended when the upper sides of the actuators are pressurized. A port 78a in the actuator 75a communicates with the line 73a while a port 78b in the actuator 75b communicates with the line 73b.

Pursuant to the invention, a floating lever system 76 includes a floating lever 80 which is acted upon by the pins 77a and 77b of the actuators 75a and 75b. The floating lever 80 extends transversely of the lever 50 and is located above the spring 52. A pin 81 extends through the midportion of the floating lever 80 and mounts that lever to pivot on the lever 50, the pin being located directly over the spring 52 and being centered between the actuators 75a and 75b.

While the pins 77a and 77b of the actuators 75a and 75b could act directly on the floating lever 80, intervening levers 82a and 82b preferably are provided in order to amplify the force of the actuators and to enable the force applied to the lever 80 by one actuator to be "weighted" relative to the force applied to the lever by the other actuator. The intervening levers 82a and 82b are pivoted on the bracket 53 at 83a and 83b, respectively, and are located with their upper sides disposed in engagement with the pins 77a and 77b. The lower sides of the levers 83a and 83b engages buttons 84a and 84b (FIG. 3) threaded on the upper ends of screws 85a and 85b which extend through elongated slots 86a and 86b (FIG. 4) in the floating lever 80. By loosening the screws, the buttons may be adjusted lengthwise of the floating lever 80 to change the distance between each button and the pivot pin 81.

As a result of the intervening levers 82a and 82b, the force which is applied by each pin 77a, 77b to the floating lever 80 is amplified by a factor which is proportional to the distance between the pin and the respective button 84a, 84b. If the buttons are spaced equally from the pivot pin 81, each force is amplified equally and thus the weighted value of one force is equal to the weighted value of the other force. Although not shown in the drawings for purposes of simplicity, the spacing between the button 84a and the pivot pin 81 is set in this particular instance so as to be less than the spacing between the button 84b and the pivot pin 81. Thus, if the forces exerted by the two actuator pins 77a and 77b are equal, the weighted value of the force applied to the floating lever 80 by the pin 77a is less than the weighted value of the force applied to the floating lever by the pin 77b.

With the foregoing arrangement, the pins 77a and 77b of both actuators 75a and 75b are fully retracted when both hoods 65a and 65b are inoperable because, under this condition, both valves 70a and 70b are positioned to vent the actuators as shown in FIG. 1. As a result, the lever 50 is located in its furthermost counterclockwise position with the minimum air flow being established by the vertically adjusted position of the set screw 55. The set screw may, for example, be adjusted to establish a minimum air flow of 200 cfm.

Now assume that the hood 65a is activated. As an incident thereto, the valve 70a shifts to pressurize the actuator 75a and fully extend the pin 77a. Accordingly, the pin 77a pivots the lever 80 counterclockwise with the button 84b serving as a fulcrum point. Thus, downward force is applied to the lever 50 to swing that lever clockwise and increase the air flow. By properly positioning the buttons 84a and 84b, the force applied to the lever 50 can be set so as to establish an air flow of 450 cfm. when the pin 77a is fully extended and the pin 77b is fully retracted.

Assume now that the hood 65a is inactivated and that the hood 65b is activated. Under this condition, the valve 70a is shifted to fully retract the pin 77a while the valve 70b is shifted to fully extend the pin 77b. Thus, the pin 77b swings the lever 80 clockwise with the button 84a serving as a fulcrum point. Because of the differential spacing of the buttons 84a and 84b from the pivot pin 81, the downward force applied to the lever 50 by the fully extended pin 77b is greater than that which previously was applied by the pin 77a when that pin was fully extended. With the buttons properly positioned, the downward force applied to the lever 50 by the fully extended pin 77b establishes an air flow of 550 cfm.

If the hood 66a then is activated while the hood 66b remains activated, the pin 77a extends so that both pins 77a and 77b push downwardly on the lever 80. The added force is applied to the lever 50 and increases the air flow to, for example, 1050 cfm.

From the foregoing, it will be apparent that the present invention brings to the art a new and improved pneumatic controller 30 in which two actuators 75a and 75b respond to any of four conditions and set the air flow in accordance with the prevailing condition. This is achieved by virtue of the floating lever 80 causing the lever 50 to be positioned with a force which varies as a function of the weighted values of the forces exerted by the actuators 75a and 75b. As a result of the floating lever, only two actuators are required to respond to the four conditions and thus the controller 30 is of relatively simple and inexpensive construction.

Those familiar with the art will appreciate that the pin 77a, 77b of either actuator 75a, 75b need not necessarily be fully extended or fully retracted at any given time. For example, either or both of the actuators could respond to a signal, such as a temperature signal, which varies over a wide range rather than to a signal which simply varies between on and off. Thus, the pin of an actuator which responds to a temperature signal could reach a steady state position between its fully extended and fully retracted positions.

I claim:

1. A pneumatic controller for providing a pneumatic control signal, said controller comprising a pneumatic control signal bleed nozzle, a flapper associated with said nozzle, means for applying a force tending to move said flapper in one direction relative to said nozzle, a bias member for applying a force tending to move said flapper in the opposite direction relative to said nozzle, said pneumatic control signal varying as a function of the position of said flapper, and mechanism for producing a force to alter the force applied by said bias member to said flapper, said mechanism comprising a pivoted lever for altering the force applied by said bias member to said flapper as said lever is swung back and forth, said mechanism further comprising first and second actuators for producing first and second forces as functions of first and second variable signals, respectively, the improvement in said pneumatic controller comprising, means for receiving said first and second forces and for causing said lever to be positioned with a force which varies as a function of the sum of the weighted values of said first and second forces, said force receiving means comprising a second lever extending transversely of and pivotally mounted on said one lever to turn about a predetermined axis relative to said one lever, said actuators acting on said second lever so as to cause said second lever to pivot in one direction when said first force increases and to pivot in the opposite direction when said second force increases.

2. A pneumatic controller as defined in claim 1 further including means for selectively adjusting the distance between said axis and the point at which each of said first and second forces is applied to said second lever.

3. A pneumatic controller as defined in claim 2 in which said last-mentioned means comprise fulcrums adjustable lengthwise along said second lever, and an additional lever acting between each fulcrum and each actuator for amplifying the force exerted by the respective actuator and for applying the amplified force to the respective fulcrum.

4. A pneumatic controller for providing a pneumatic control signal, said controller comprising a pneumatic control signal bleed nozzle, a flapper associated with said nozzle, means for applying a force tending to move said flapper in one direction relative to said nozzle, a bias member for applying a force tending to move said flapper in the opposite direction relative to said nozzle, said pneumatic control signal varying as a function of the position of said flapper, and mechanism for producing a force to alter the force applied by said bias member to said flapper, said mechanism comprising a pivoted lever for altering the force applied by said bias member to said flapper as said lever is swung back and forth, said mechanism further comprising first and second actuators for producing first and second forces as functions of first and second variable signals, respectively, the improvement in said pneumatic controller comprising, a second lever extending transversely of and pivotally mounted on said one lever to turn about a predetermined axis relative to said one lever, said actuators acting on the same side of said second lever but on opposite sides of said axis so as to cause said second lever to pivot in one direction when said first force increases and to pivot in the opposite direction when said second force increases.

5. A pneumatic controller as defined in claim 4 further including means for selectively adjusting the distance between said axis and the point at which each of said first and second forces is applied to said lever.

* * * * *